E. KEMPSHALL.
ANTISKIDDING TIRE.
APPLICATION FILED APR. 20, 1908.

917,612.

Patented Apr. 6, 1909.

UNITED STATES PATENT OFFICE.

ELEAZER KEMPSHALL, OF LONDON, ENGLAND.

ANTISKIDDING TIRE.

No. 917,612.     Specification of Letters Patent.     Patented April 6, 1909.

Application filed April 20, 1908. Serial No. 428,276.

*To all whom it may concern:*

Be it known that I, ELEAZER KEMPSHALL, citizen of the United States of America, and residing at the Hotel Russell, Russell Square, London, W. C., England, have invented certain new and useful Improvements in Antiskidding Tires, of which the following is a specification.

Pneumatic tires which have thickened tread portions, and sides or barrel portions which gradually taper in thickness toward the rim or felly, are admittedly advantageous as compared with tires which are of equal thickness throughout, or substantially so, especially for automobiles. But I have found that the heavy tread causes great stress to be thrown on the relatively weak side portions so as to frequently break the latter down. When the tread surface of such a tire is formed with recesses which act as suction chambers when coming in contact with the road and when there is a tendency to skid that is resisted by the suction chambers, there is still greater tendency to break the tire down along its weak sides.

The object of the present invention is to provide means for increasing the strength of the barrel portion of the tire and also to increase the cooling effect when running, and the invention consists in continuing the sides of the circular studs in the form of ribs which extend around the barrel portion of the tire tapering off toward the beaded or other rim portion where they merge into the tire itself.

Figure 1:
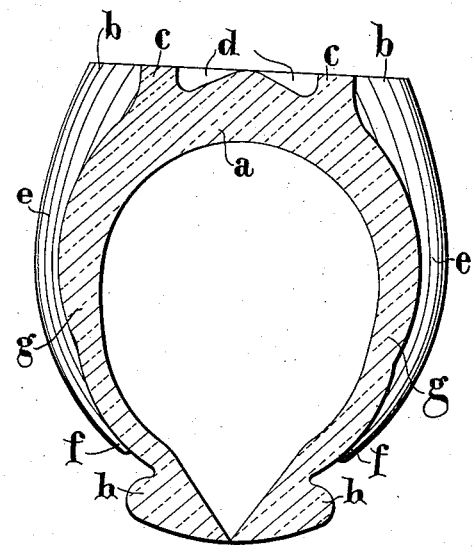
Figure 3:
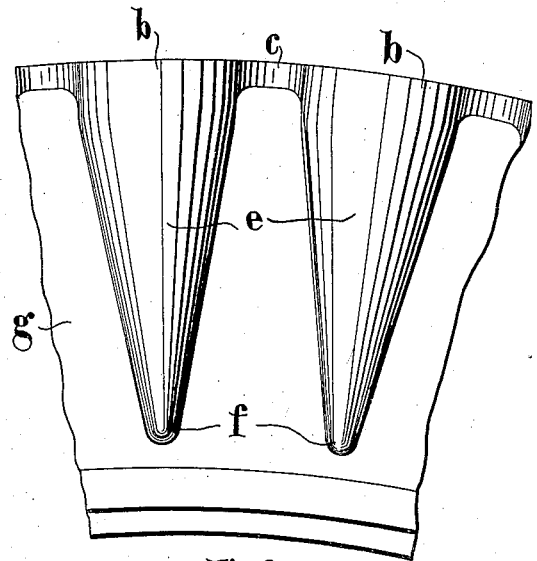
Figure 2:
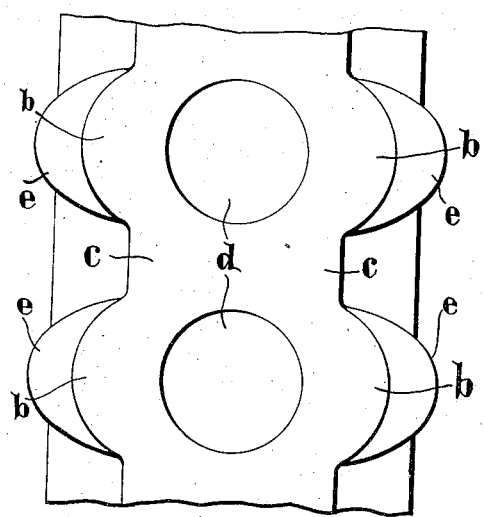

Of the accompanying drawings which illustrate the tire constructed according to this invention—Figure 1 represents a cross-section. Fig. 2 a plan, and Fig. 3 a side elevation of a tire constructed in accordance with my invention.

In carrying out the invention a pneumatic tire having a thick tread portion $a$ and side or barrel portions $g$ which taper in thickness away from the tread, has its tread surface formed with a series of circular studs $b$ connected by intermediate portions $c$ and also provided with recesses $d$. The portions of the studs $b$ which form the sides of the recesses $d$ are continued or extended in the form of ribs $e$ which taper off toward their ends $f$ where they merge into the barrel portion of the tire $g$ near the beaded or other edge $h$. These ribs $e$ not only greatly strengthen the barrel portion $g$ of the tire, but their thick ends reinforce the walls of the suction recesses and they also offer considerable surface to the air during the running of the wheel and prevent the tire becoming over-heated. Another advantage of the ribs $e$ is that they distribute the stress of pressure from the thick tread to the thinner sides in substantial proportion to the tapering thickness of the side walls $g$, so that tendency of the thin portions to break down is overcome, and this without altering the relative resilience of different portions of the tire.

Having now described my invention, what I claim is:—

1. A pneumatic tire having a thick tread portion and sides which taper in thickness away from the tread, the surface of the tread having a series of circular studs connected by intermediate portions, the sides of the tire having ribs forming extensions of the sides of the stud, the outer ends of the ribs laterally strengthening the tread studs, substantially as and for the purpose hereinbefore set forth.

2. A pneumatic tire comprising a thick tread portion and sides which taper in thickness away from the tread, the surface of the tread having a series of studs $b$ connected by intermediate portions $c$ and having recesses $d$, the sides of the tire having ribs $e$ forming extensions of the sides of said studs, said ribs tapering toward their ends $f$ near the edges of the tire, substantially as and for the purpose hereinbefore set forth.

In testimony whereof I have signed my name to this specification in the presence of two subscribing witnesses.

ELEAZER KEMPSHALL.

Witnesses:
  A. W. MATHYS,
  B. H. MATTHEWS.